Inventor:
HEINZ AUGUSTIN
By Toulmin & Toulmin
Attorneys

United States Patent Office

3,066,635
Patented Dec. 4, 1962

3,066,635
COURSE CONTROLLING SYSTEM
FOR VEHICLES
Heinz Augustin, Hamburg-Harburg, Germany, assignor to Licentia Patent-Verwaltungs-G.m.b.H., Frankfurt am Main, Germany
Filed Nov. 19, 1959, Ser. No. 854,166
Claims priority, application Germany Nov. 20, 1958
9 Claims. (Cl. 114—144)

The present invention relates to a system for controlling the course of air- or seaborne vehicles. More in particular, the present invention relates to a system for controlling a control surface such as a rudder and accordingly the air- or seaborne vehicles such as ships, airplanes, missiles and the like having such control surface or rudder.

It is known to provide a control system of the above-referred to general type wherein the adjustment of the rudder is effected dependent upon the degree and the progress of deviations from course. In other systems the optimal central position of the rudder is effected, thus compensating deviations from course due to particular disturbing factors such as wind, waves etc.

It has already been proposed to combine the control elements in such control systems so as to form a chain of control elements, having one common amplifying means; the output terminal of the common amplifying means is connected with the adjusting members for displacing the rudder.

These known control systems are, however, unsatisfactory. The rudder is actuated too frequently and at the slightest deviation from the desired course. In addition, the actuation of the rudder is continued substantially until the vehicle has regained its desired course. Since the rudder tends to continues with its movement, largely due to its inertia, even after its actuation has been discontinued, the vehicle is moved beyond the desired course. This "lag displacement" of the rudder is substantially disregarded by the control system, and the deviation from course is thus overcompensated.

As a consequence of the foregoing, the vehicle tends to perform oscillatory movements rather than following its desired course straightly and directly. This is, of course, highly undesirable and disadvantageous.

It is the general object of the present invention to provide a control system for controlling the course of air- or seaborne vehicles, and particularly vessels which controls the course effectively under the most varying operating conditions without requiring an excessive operation of the steering engine, and which effectively eliminates oscillatory movements of the vehicle due to an overcompensation of deviations from the desired course.

It is a particular object of the present invention to provide a control system for controlling the course of air- or seaborne vehicles, and particularly vessels which provides a variable non-sensitivity range in which the steering mechanism is not actuated.

It is another object of the present invention to provide a control system for controlling the course of air- or seaborne vehicles, and particularly vessels, which provides means for taking into account the lag displacement of the rudder occurring after the actuation of the same has been discontinued, so as to accurately stop the movement of the rudder once the necessary correction of the course has been effected.

These objects as well as further objects and advantages which will become apparent as the description proceeds are achieved by the course control system of the present invention which comprises a zero displacing and lag displacement circuit, adapted to displace the zero point of the control operation so as to create a determined, non-sensitive range not effecting any control adjustment of the course of the vehicle, and furthermore adapted for ending the control actuation before the steering mechanism has reached the desired position, so as to allow the lag displacement of the steering mechanism to cover the distance between the position where the control actuation is ended and the desired position. This is done by increasing the pre-excitation or the control current or voltage of amplifying means—the latter being used for all individual control circuits in the system—at the end of each control operation, and by decreasing the pre-excitation, or the control current or voltage at the beginning of each control operation.

The invention will be better understood upon the following detailed description of the accompanying drawings, wherein.

Figure 6:
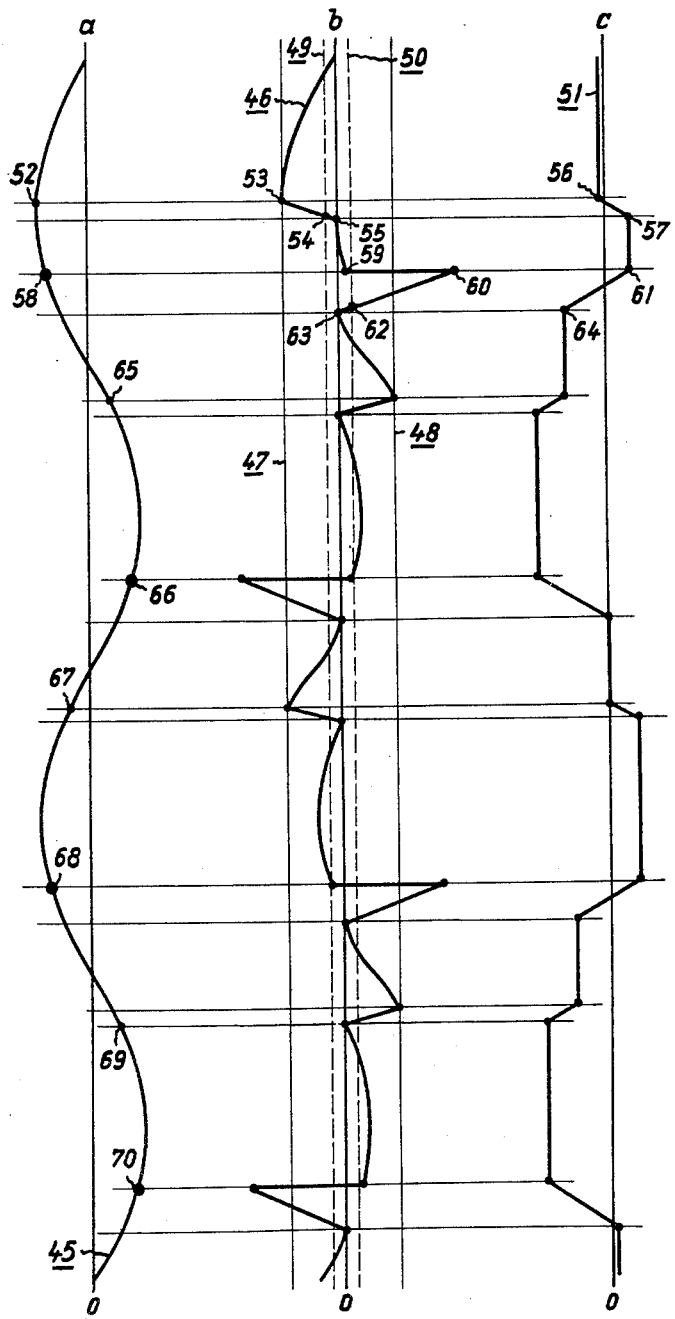

FIGURE 6 is a diagram showing the characteristic curves showing, by way of example, respectively, the course of a vessel as adjusted by the course control system of the invention; the control current produced in the amplifying means; and the various positions of the rudder of the vessel; each for a particular example of an adjusted position of the zero displacing and lag displacement means in the course control system of the invention.

The invention is described with reference to the drawings for the particular example of controlling and adjusting the course of a vessel. It will, of course, be understood, that this is done merely by way of example and not limiting the scope of the applicability of the control system of the invention.

The control system of the invention comprises three control circuits 8, 9 and 10, communicating with the magnetic amplifier means 4 and 5, adding or subtracting to or from one another the control pulses produced in the three control circuits, and applying the same to a first and a second output relay 6 and 7, for port side and starboard side actuation of the rudder, respectively.

Relays 6 and 7 thus are actuator means, which can assume each an "on" and an "off" state, depending upon the output current of the magnetic amplifier.

The three control circuits are hereinafter designated as the "course circuit" 8, the "rudder circuit" 9 and the "sensitivity range adjustment or control circuit" 10 determining what is described above as zero displacement and lag-displacement.

The magnetic amplifiers 4 and 5 advantageously consist of voltage controlling transducers having a direct current output. By the use of such transducers a comparatively great output is obtained with a small input of control energy. It is thus possible to use small elements, such as resistances, contacts and potentiometers, in the various control circuits.

In the course control circuit 8 of a potentiometer 1, designated as "course potentiometer," is provided opposite to a second potentiometer 11, referred to as "course correcting potentiometer," the latter potentiometer being series-connected with two resistances 11a and 11b.

Figure 1:
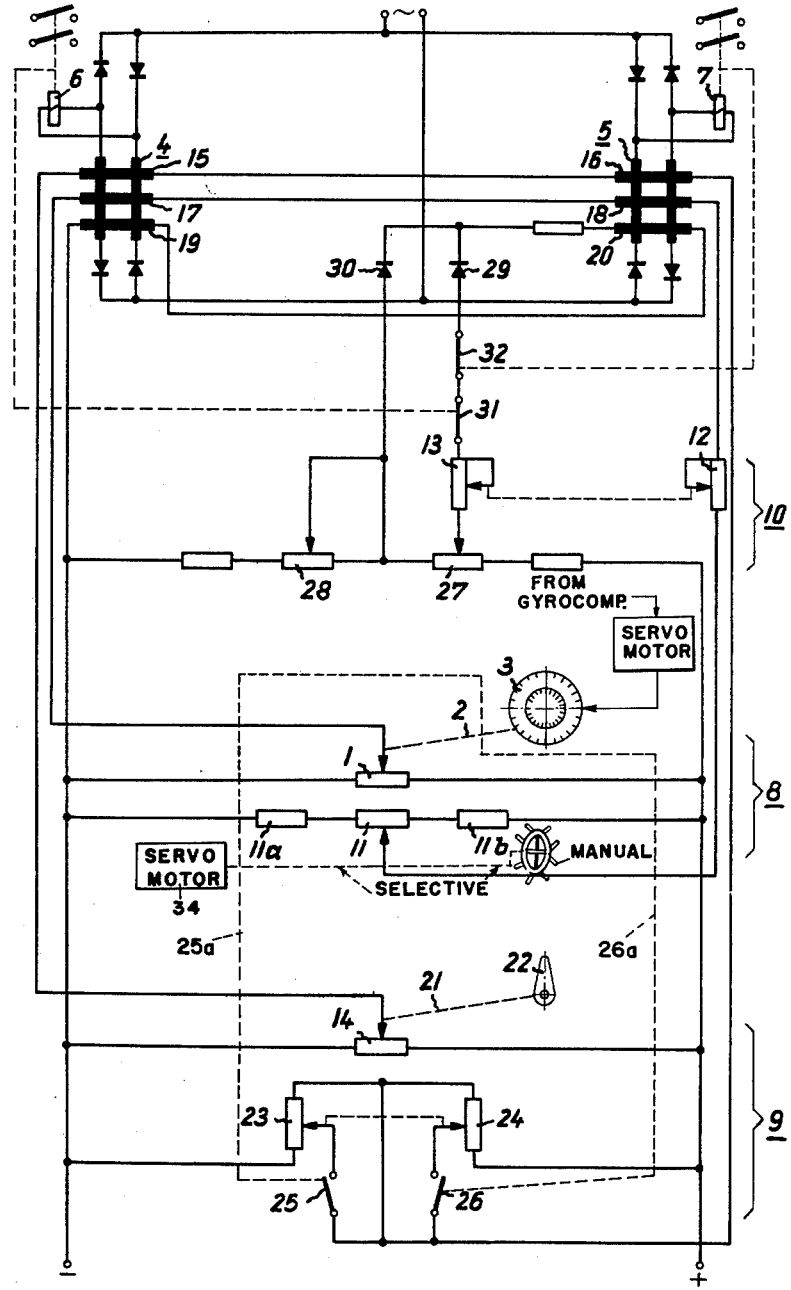
FIGURE 1 is a wiring diagram of the control system of the invention.
Figure 2:
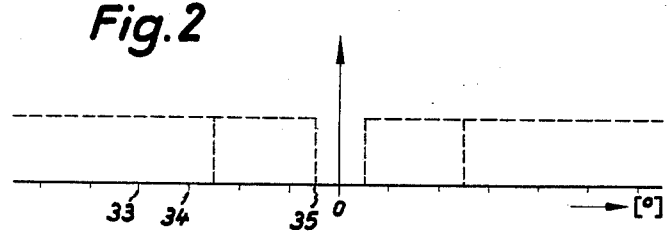
FIGURES 2 to 5 are diagrams illustrating the zero displacement and lag displacement for various adjusted positions of the zero displacing and lag displacement means.

Potentiometer 1 is displaced by the steering mechanism of the vehicle in a known manner, for example, by the gyrocompass (not shown) of a vessel, with the aid of a servo-motor and via mechanical adjusting means schematically indicated by the dashed line 2 in FIGURE 1. It is further possible to connect a repeater compass 3 having a servo-motor 33 for linking it drivingly to the gyrocompass with the conventional mechanical adjusting means for indicating the actual value of the course of the vehicle, e.g. a vessel. All these mechanical adjusting means for setting the potentiometer are well known in the art and, hence, need not be described nor shown in greater detail. Course potentiometers controlled by gyros are for example described in U.S. Letters Patent 2,755,-427, 2,764,370 and 2,770,429.

At the start of the controlling operation of course circuit 8 the potentiometer 1 assumes the central position shown in FIGURE 1. This is equivalent to the zero position, as no voltage difference exists between potentiometers 1 and 11. As soon as the vessel deviates from its intended course, either in a port side direction or in a starboard side direction, the potentiometer is displaced correspondingly, leftwards or rightwards, by the gyrocompass via the servo motor 33 with repeater compass 3 and the mechanical transmission. The entire control range of the course potentiometer 1 has a predetermined value such as, for example, ±20°.

The course correcting potentiometer 11 can be adjusted manually or automatically. The automatic adjustment can be effected in a known manner, for instance, by means of a servo-motor, depending upon the respective deviation in port side or starboard side direction. The servo-motor is controlled by conventional means, following the deviations from the desired course. The potentiometer 11 can also be adjusted by hand. If, for example, the vessel has a constant mean deviation from the desired course of 2.5° in port side direction, the potentiometer is set to "starboard 2.5°," thereby causing an adjustment of the rudder, until the course potentiometer 1 effects the control of course in accordance with the position of potentiometer 11.

In the central position shown in FIGURE 1, the potentiometer 11 is in zero position, as no voltage differential exists relative to potentiometer 1. The adjusting range can be selected to be, for example, in the order of ±10°. The course circuit 8 is connected with the control windings 17, 18 of transducers 4 and 5, and which are actuated counter-currently, transducer 4 being actuated via its control winding 17 with current flowing through course circuit 8 in one, predetermined direction, and transducer 5 being actuated via its control winding 18 with the current flowing through course circuit 8 in the opposite direction.

Since the control system is to be used with the most various types of vessels and under greatly differing operating conditions the sensitivity of the rudder control system of the invention will have to be adjusted. The invention therefore provides a rheostat 12 which may be called rudder control sensitivity rheostat. This rheostat is provided in the course circuit 8 between potentiometer 11 and control winding 18 of transducer 5. By adjusting rheostat 12, the amplitude of the exciting pulse produced in circuit 8 and transmitted to control windings 17, 18 of transducers 4, 5, is varied; thus, for similar deviations from course a different current flows in circuit 8, which depends, as stated on the setting of rheostat 12 which in turn depends on the type of vessel. Rheostat 12 can be selected, e.g., from 0.5–4° rudder per degree of deviation from course.

A further rheostat 13 is mechanically connected in a known manner, in order to transmit the pitch factor to the amplifier sensitivity range adjustment and lag displacement circuit 10, as described in greater detail further below.

The rudder circuit 9 comprises the potentiometer 14, connected with the control windings 15, 16 of transducers 4, 5, the tandem potentiometers 23, 24 and the trailing contacts 25, 26. The rudder circuit 9 has two different functions. A first function of rudder circuit 9 is effected by potentiometer 14 which is mechanically connected in a known manner with the rudder 22, as indicated by the dashed line 21.

The potentiometer 14 can be connected with the rudder shaft as, e.g., in mechanical quadrant steering engines, via a chain drive, a parallelogram guide or the like. In steering engines with special adjusting gear means, as in most hydraulic or in steam steering engines, the potentiometer 14 is connected with the adjusting gear means in order to avoid oscillations due to additional lag displacement angles. By a displacement of rudder 22, potentiometer 14 is moved from the zero position shown in FIGURE 1, and correspondingly a voltage difference is produced in circuit 9, so as to excite the control windings 15 or 16 of transducers 4 and 5, respectively. It is thus a first function of rudder circuit 9 to transmit feedback signals to the transducers 4, 5, indicative of the respective positions of the rudder. The displacement of potentiometer 14 initiating such repeat signals covers the entire range of movement of the rudder, e.g., from 35° starboard over zero position to 35° port.

The second function of the rudder circuit 9 consists of producing a determined counteraction applied to the rudder movement at that moment when the vessel starts to return from its greatest deviation from course to the desired course. This is effected by the adjustable tandem potentiometers 23, 24 and the trailing contacts 25, 26. The latter contacts are actuated via a slide coupling. Slide couplings with trailing contacts are shown for example in German Patent 951,423 issued October 25, 1956. Such slide coupling links the trailing contacts 25 and 26 directly to the mechanical transmission 2 of the auxiliary compass, (links 25a and 26a) so that, for example, contact 25 is closed with a port side deviation from course and contact 26 is closed with a starboard side deviation from course. The connection between a trailing contact and a transmission pertaining to an auxiliary compass are specifically shown in the aforementioned German Patent 951,423. The respective position of the contacts is reversed as soon as the vessel has started to return from its greatest deviation to the desired course. The return angle can be, for example, from 0.1 to 0.2, or it may comprise a greater range. The adjusting range of the tandem potentiometers 23, 24 can be, for instance, from 0° to 10°. The counteraction applied to the rudder is chosen according to the particular requirements of each case so as to dampen the control operation of the course adjustment.

The control currents of rudder circuit 9 flowing in the control windings 15, 16 of transducers 4, 5, produce a flux therein opposite to that as set up by windings 17 and 18 of circuit 8. The current in windings 15 and 16 is determined by the potentiometer 14 which, in turn, also neutralizes the counter rudder adjusted according to the respective positions of trailing contacts 25, 26. This mutual neutralization of the control currents of circuits 8 and 9 is necessary for the control currents of circuit 9 to become effective, as described below.

Turning now to the amplifier sensitivity range adjustment and lag displacement circuit 10, this circuit serves two different functions. The circuit 10 shifts the minimum response limit from where the rudder control system starts to operate and respond, so as to create a predetermined, non-sensitive range in which the control system does not operate. In addition, the circuit 10 is to assure a timely discontinuation of the control operation so as to take into account the inevitable lag displacement of the rudder which takes place after the control actuation has ended.

The circuit 10 comprises two control windings 19 and 20 in the transducers 4 and 5, which are, contrary to the other control windings of the transducers, not opposing, but aiding in series-connection. The control windings 19 and 20 thus have the same effect as, e.g., a precurrent winding for blocking the transducers 4, 5. The circuit further comprises a sensitivity or non-sensitivity adjusting potentiometer 27 with which the minimum response limit of the control circuit can be shifted, a lag displacement potentiometer 28, the pitch correcting rheostat 13, mechanically connected with control sensitivity adjustment rheostat 12, rectifiers 29 and 30, relays 6 and 7, and, associated with the latter, relay contacts 31, 32. Potentiometer 27 is preferably so chosen that the minimum response limit of the non-sensitivity range can be adjusted in terms of a predetermined degree of the course such as, e.g., 0.5° to 5°. (See reference numerals 36 and 37 in FIG. 3, infra.) To make this possible it will be necessary to consider the fact that for a certain minimum response various positions of rheostat 12 result in corresponding various positions of the course potentiometer 1 in the course circuit 8. As the minimum response is effected with respect to a predetermined course angle rather than with respect to a rudder angle, any change of the pitch of the rudder must be accompanied by a corresponding adjustment of the minimum response determining the non-sensitive range, in order to keep this range constant. This is done by mechanically connecting rheostat 12 with the pitch correcting rheostat 13, as indicated by the dashed line in FIGURE 1. Such a correction is not necessary, if the transducers 4 and 5 are supplied with control currents determined with respect to the position of the rudder instead of the course. This would be, however, disadvantageous inasmuch as the crew of the vessel can easily follow the deviations from course by reading the compass with a view to determining the most advantageous non-sensitive range, whereas it cannot observe the various movements of the rudder.

The non sensitivity is defined by operation of circuit 10 as follows: As long as relays 6 and 7 are opened, each of the associated contacts 31 and 32 is closed, and the zero displacing potentiometer 27 excites the control windings 19 and 20, thereby blocking transducers 4 and 5 and creating a certain non-sensitive range. The extension of this range depends upon the respective adjusted position of potentiometer 27. During this period the lag displacement potentiometer 28 remains inoperative as rectifier 29 operates with priority over potentiometer 28 and rectifier 30. As soon as a change takes place in course circuit 8 and/or circuit 9 with a subsequent change of the control voltage in transducers 4 and 5, e.g. in such a manner that transducer 4 opens and closes port side relay 6, contact 31 is opened and potentiometer 27 is disconnected from circuit 10. At this moment, lag displacement potentiometer 28 becomes effective, having for instance, an adjusting range of 0.5–2.5° rudder deflection for the then existing degree of rudder deflection. The non-sensitive range of transducers 4 and 5 is consequently reduced. The steering machine then turns the rudder in port side direction and rudder-potentiometer 14 is adjusted correspondingly. After the control windings have been excited up to the valve determined by the respective adjusted position of lag displacement potentiometer 28, transducer 4 causes relay 6 to open. The rudder does, however, continue its previous movement for a predetermined period of time. This lag displacement depends, of course, on the particular construction of the rudder and the steering machine and varies from case to case. In any case, the rudder potentiometer 14 is adjusted by the amount of this lag displacement, i.e. if the lag displacement is 1.5°, the potentiometer 14 is also displaced by 1.5°. The particular lag displacement angle of a particular rudder and steering mechanism, for example 1.5° is taken into account in the control system of the invention by presetting the lag displacement potentiometer 28 accordingly, thereby preventing oscillations of the rudder which would be caused by a too narrow insensitivity range of the transducers 4 and 5. As soon as relay 6 is closed, contact 31 is opened again, whereupon the potentiometer 27 becomes effective, displacing the minimum response limit of the control operation of the system and creating a more extensive non-sensitive range.

The influence of the two potentiometers 27 and 28 on the course control is illustrated in FIGURES 2, 3, 4 and 5. It is assumed, for example, that through a deviation from course an excitation output in the control windings of the transducers has been obtained corresponding to a rudder angle of 4°, designated by point 33 in FIGURE 2. Relay 6 then has closed the relay contact 31. The steering engine now put into operation so adjusts potentiometer 14 that the excitation output total is reduced. If the potentiometer 28 has been adjusted to its maximum value, relay 6 closes at point 34. If, on the other hand, potentiometer 28 has been adjusted to its smallest value, relay 6 closes later, at point 35 in FIGURE 2. Between these two extreme values the potentiometer 28 can be adjusted to any desirable point between 34 and 35. The potentiometer 28 is so adjusted that the actuation of the rudder is discontinued at the adjusted point and the rudder then performs the lag displacement so as to reach zero position. Since the control windings 19 and 20 are connected in series, the corresponding adjusting values apply with respect to transducer 5 in case of an actuation of the rudder in the opposite direction, as shown in the right-hand portion of FIGURE 2. The potentiometer 28 can be calibrated in degrees of "lag displaecment" or "rudder."

Figure 3:
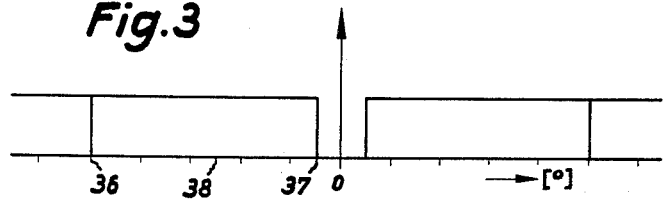

FIGURE 3 illustrates the adjusting range for a zero displacement. Point 36 designates the maximum zero displacement, for example, to a deviation from course of 5°, whereas point 37 designates the smallest zero displacement, for example, to a deviation from course of 0.5°. According to the adjusted position of potentiometer 27, (for example, point 38) the steering engine is actuated via relay 6 or 7 as soon as the vessel has performed a deviation corresponding to the adjusted position of potentiometer 27.

Potentiometer 27 makes it possible to displace the zero point and enlarge the non-sensitive range, so as to vary the frequency with which the rudder is actuated. By reducing the frequency, periodical yawing movements can be suppressed and the rudder is actuated only after a considerable deviation of course has occurred.

Figure 4:
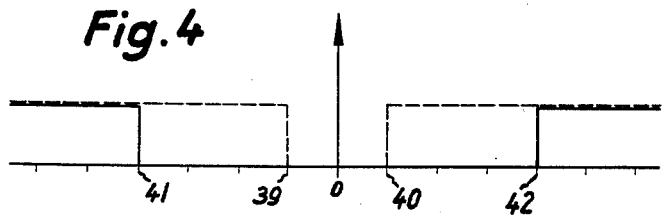

This is further illustrated by the example shown in FIGURE 4, wherein the lag displacement potentiometer 28 has been adjusted as designated by point 39 (with a corresponding point 40 in case of deviations in the opposite direction). The now sensitivity range or sensitivity range adustment potentiometer 27 has been adjusted to a value 41 (with a corresponding value 44 in case of opposite movement). The steering engine is actuated as soon as the deviation from course exceeds the value 41 or 42, respectively, whereupon the rudder is shifted. The actuation of the rudder is, however, discontinued already prior to the zero position at point 39 or 40, respectively, the remaining necessary displacement of the rudder to zero being taken care of by its lag displacement.

Figure 5:
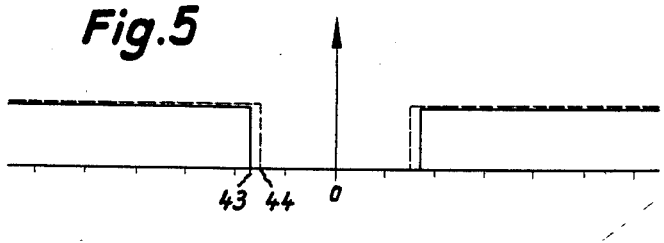

A further example is given in FIGURE 5, wherein the lag displacement range has been made greater than the zero displacement. Point 43 indicates an angle at which the steering engine is started and point 44 indicates the angle wherein its operation is discontinued. By properly dimensioning and positioning the resistances and valves 29 and 30 the adjustment of the lag displacement potentiometer also determines the zero displacement in this particular case, so as to prevent oscillations in the course control.

The operation of the control system of the invention is further illustrated by the three characteristic curves shown in FIGURE 6. In the portion *a* of FIGURE 6 the zero axis designates the desired course and the characteristic curve 45 designates the deviation from the desired course. The characteristic curve 45 is to be read from the top end of FIGURE 6 downwards as a function of time. In the same manner the characteristic curves in portions *b* and *c* of FIGURE 6 are to be read downwards also as a function of time. The characteristic curves in portion *b* indicate the total excitation of each transducer 4 and 5 composed of the control currents of the control windings 15, 17, 19 and 16, 18 and 20, respectively. In the characteristic curve 46 the left-hand side, viewed from the zero axis, is assumed as designating the opening of the port side transducer 4 and the blocking of starboard side transducer 5. The characteristic curve 46 thus shows the excitation in each transducer as produced by the control windings 15, 16, 17 and 18. The full line 47 indicates the control current as determined by the adjusted position of potentiometer 27 having reached the value capable of actuating relay 6. Characteristic line 48 is the corresponding line with respect to relay 7, the response of which latter is also determined by the adjusted position of potentiometer 27. The full lines 47 and 48 are also influenced by the tandem potentiometers 12, 13 as it is assumed that in the example shown in FIGURE 6, potentiometer 27 has been calibrated in degrees of the course of the vehicle.

The dashed line 49 indicates the control current as produced in windings 15 to 18, only, at which relatively low control excitation relay 6 opens and the actuation of the steering engine is discontinued. This line is defined by the adjusted position of lag displacement potentiometer 28. This potentiometer is so adjusted that the rudder comes to a stop substantially at a point defined by the zero axis. The line 50 is the corresponding line with respect to relay 7, also defined by the adjusted position of potentiometer 28.

In the portion c of FIGURE 6 the charactteristic curve 51 is indicative of the respective position of the rudder and also indicates a change of the rudder angle, with reference to the example of the characteristic curve 45 of the course of the vessel. The zero axis designates a central position of the rudder.

The operation of the control system will next be described with reference to FIGURES 1 and 6 and is as follows: In the uppermost part of FIGURE 6, at point 51, the rudder is close to its central position. The vessel deviates from the desired course in starboard side direction. At point 52 the potentiometer 1 has excited the transducers 4 and 5 to an extent that port side transducer 4 actuates relay 6, see point 53. The rudder is then adjusted in port side direction and, subsequently, the rudder potentiometer 14 decreases the excitation of transducers 4 and 5, until, at point 54, the excitation has dropped to an extent that relay 6 is switched off and the rudder is no longer actuated; it continues to move until its lag displacement has come to an end at point 57. Consequently, the vessel does not deviate substantially from the desired course and starts to return to the desired course. At point 58 the steering engine is again actuated by the opening of trailing contact 26 and closing of trailing contact 25 which contacts are limited to compass 3 as stated above. The change in excitation of transducers 4 and 5 corresponds to the adjusted position of tandem potentiometers 23, 24, as indicated by the jump between points 59 and 60 in FIGURE 6. Transducer 5 is in "on" state and relay 7 causes actuation of the steering engine at point 61, so as to effect an adjustment of the rudder in starboard side direction. Thereupon the rudder potentiometer 14 again reduces the excitation of transducers 4 and 5 until the steering engine is switched off by relay 7 as soon as point 62 has been reached. Due to the lag displacement of the rudder, the latter comes to a halt approximately at point 63. The adjustment of the rudder by the tandem potentiometers 23, 24 counteracting the actual movement of the rudder is designated in portion c of FIGURE 6 by the area between points 61 and 64.

The remaining portions of the characteristic curves are to be understood in an analogous manner as aforedescribed. At point 65 potentiometer 1 increases the starboard side rudder angle. At point 66 the trailing contact 25 is opened and trailing contact 26 is closed, and the movement of the rudder is counteracted. At point 67 potentiometer 1 adjusts the rudder in port side direction and at point 68 trailing contact 26 opens, whereas trailing contact 25 closes and the movement of the rudder is counteracted in starboard side direction. At point 69 the rudder is adjusted in starboard side direction by potentiometer 1, and at point 70 trailing contact 25 opens, trailing contact 26 closes, and the movement of the rudder is counteracted in port side direction.

The various elements in the control system of the present invention need not necessarily be the elements specified, by way of example, in the foregoing detailed description of the circuits. Thus, it is possible to use, as a course potentiometer 1, for example, a contactless Selsyn system or a capacitive transmitter, with a phase comparison and subsequent rectification. The transducers 4 and 5 can be replaced by other amplifying means making use, for example, of tubes, transistors, controllable valves, thyratrons and the like elements. Furthermore, it is possible to omit from the control system relays 6 and 7 and to feed the control currents directly to the Leonard fields of the control generator of the steering engine or to transducers provided in the steering engine system. Furthermore, the tube terminals of the transducers 4 and 5 can be connected with other known amplifying means, for example, magnetic valves and hydraulic or pneumatic devices. The potentiometer 14 can also be used in the form of a contactless Selsyn system or as a capacitive answer-back unit, with phase comparison and subsequent rectification. It will also be noted that the unit 14 need not be an element of the course trailing system and it is possible to use a device of manual operation of the rudder. Furthermore, it is also possible to divide the transducers 4 and 5 according to course and rudder control in such a manner, that the course circuit 8 and potentiometer 27 actuate the course transducer, whereas rudder circuit 9 and lag displacement potentiometer 28 actuate the rudder transducer. Furthermore, the direct current control can be replaced by alternating current control. In this case it will be necessary to effect a phase comparison and, subsequently, rectification prior to feeding the current to the control windings of the transducers. This will also be necessary where tubes, thyratrons or transistors are used. It is, however, also possible to actuate the amplifying means directly by the alternating current voltage, by using, for example, a push-pull circuit with a phase comparison.

It will be noted that the course control system of the present invention is applicable for use as a control of a plurality of rudder or stabilizing shafts of any vehicle or moving object, the movement of which has to be controlled. It will also be understood that this invention is susceptible to modification in order to adapt it to different usages and conditions and, accordingly, it is desired to comprehend such modifications within this invention as may fall within the scope of the appended claims.

What I claim is:

1. A control system for controlling the course of air- or seabound vehicles having a rudder comprising a rudder control actuator means, a plurality of control circuits for controlling said actuator means, amplifying means common to all of said control circuits including pre-exciter means determining its blocking state, and an amplifier sensitivity range adjustment and lag displacement circuit adapted to increase the pre-excitation at the end of each control operation and decreasing the same at the beginning of each control operation.

2. A control system for controlling the course of air- or seabound vehicles having a rudder comprising a rudder control actuator means, a plurality of control circuits for controlling said actuator means, amplifying means common to all of said control circuits, and an amplifier sensitivity range adjustment and lag displacement circuit adapted to increase a control current for blocking said amplifying means at the end of each control operation and decreasing the same at the beginning of each control operation.

3. A control system for controlling the course of airor seabound vehicles having a rudder comprising a rudder control actuator means, a plurality of control circuits for controlling said actuator means, amplifying means common to all of said control circuits, and an amplifier sensitivity range adjustment and lag displacement circuit adapted to increase a control voltage for blocking said amplifying means at the end of each control operation and decreasing the same at the beginning of each control operation.

4. A control system for controlling the course of air-seaborne vehicles having a control surface to be controlled by the said system, comprising, an adjustable control circuit network producing an output, control surface position sensing means also producing an output, amplifying means responsive to said two outputs as produced by said circuit and said sensing means, respectively, control actuator means for said control surface connected to and controlled by said amplifying means, said actuator means having on-off states, said amplifying means including circuit means defining a predetermined non-sensitivity range in which the actuating circuit is in off-state, and for temporarily reducing said range when said actuator means is in on-state.

5. A control system as described in claim 4, said circuit means for defining and reducing the non-sensitivity range including a current source, a first and a second adjusting member connected with said current source, said second adjusting member having a smaller range of adjustment than said first adjusting member, a first rectifier connected with said first adjusting member and a second rectifier connected with said second adjusting member, said rectifiers operating alternatingly and in the same direction, said first rectifier and said first adjusting member determining the said non-sensitivity range during the off-state of said actuator means, said second rectifier and said second adjusting member determining the sensitivity range during the on-state of said actuator means whereby the actuation of said control surface is limited to a predetermined period.

6. A control system as described in claim 5, said rectifiers being connected in parallel.

7. A control system as described in claim 5, further comprising at least one contact connected in series with said first adjusting member, said contact being opened by the beginning of each control operation by said actuator means and being closed at the end of each control operation by said actuator means.

8. Control system as described in claim 5, further comprising means for adjusting the degree in which said control circuit and said sensing means influence said amplifying means and means for correspondingly correcting said first adjusting member, and common adjusting means for said adjusting means and said first adjusting member.

9. Control system as described in claim 4, further comprising variable resistance means in said surface position sensing means, for counteracting the control effect produced when said actuator means is in on position.

References Cited in the file of this patent
UNITED STATES PATENTS

| | | |
|---|---|---|
| 2,182,717 | Chance | Dec. 5, 1939 |
| 2,736,856 | Jun-ichi Sasaki et al. | Feb. 28, 1956 |
| 2,958,031 | Taylor et al. | Oct. 25, 1960 |